(12) United States Patent
Fujiwara et al.

(10) Patent No.: US 7,598,189 B2
(45) Date of Patent: Oct. 6, 2009

(54) PHOSPHATE OPTICAL GLASS, PREFORM FOR PRECISION PRESS MOLDING AND MANUFACTURING METHOD OF THE SAME, OPTICAL ELEMENT AND MANUFACTURING METHOD OF THE SAME

(75) Inventors: Yasuhiro Fujiwara, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 427 days.

(21) Appl. No.: 11/195,809

(22) Filed: Aug. 3, 2005

(65) Prior Publication Data

US 2006/0150682 A1 Jul. 13, 2006

(30) Foreign Application Priority Data

Sep. 29, 2004 (JP) .............................. 2004-284740

(51) Int. Cl.
*C03C 3/17* (2006.01)
*C03C 3/19* (2006.01)
(52) U.S. Cl. ........................................ 501/48; 501/47
(58) Field of Classification Search .................. 501/47, 501/48
See application file for complete search history.

(56) References Cited

U.S. PATENT DOCUMENTS

| | | | | |
|---|---|---|---|---|
| 4,391,915 | A * | 7/1983 | Meden-Piesslinger et al. | 501/48 |
| 5,607,886 | A * | 3/1997 | Onozawa | 501/73 |
| 7,396,787 | B2 * | 7/2008 | Ritter et al. | 501/48 |
| 7,419,923 | B2 * | 9/2008 | Mori et al. | 501/47 |
| 2004/0138043 | A1 * | 7/2004 | Kasuga et al. | 501/45 |
| 2004/0259714 | A1 * | 12/2004 | Fujiwara et al. | 501/45 |
| 2005/0143250 | A1 * | 6/2005 | Fujiwara et al. | 501/48 |
| 2005/0159291 | A1 * | 7/2005 | Ritter et al. | 501/48 |
| 2007/0111875 | A1 * | 5/2007 | Fujiwara | 501/47 |
| 2008/0187737 | A1 * | 8/2008 | Fujiwara et al. | 428/220 |

FOREIGN PATENT DOCUMENTS

| | | |
|---|---|---|
| JP | 55121924 A | 9/1980 |
| JP | 56073644 A | 6/1981 |
| JP | 60171244 A | 5/1985 |
| JP | 02188442 A | 7/1990 |
| JP | 11199269 A | 7/1999 |
| JP | 2004168593 A | 6/2004 |
| WO | 2004/041741 | 5/2004 |
| WO | WO 03/072518 A1 * | 8/2008 |

OTHER PUBLICATIONS

Japanese Office Action dated Feb. 24, 2009.

* cited by examiner

*Primary Examiner*—Karl E Group
*Assistant Examiner*—Elizabeth A Bolden
(74) *Attorney, Agent, or Firm*—Sughrue Mion, PLLC

(57) ABSTRACT

Phosphate optical glass having an Abbé number, vd, of greater than 59. A preform for precision press molding being comprised of the phosphate optical glass. An optical glass being comprised of the phosphate optical glass and manufacturing method of the same. Provided are low-dispersion phosphate optical glass having a low-temperature softening property and good weatherability, suited to precision press molding, and further having good devitrification stability, a preform for precision press molding comprised of the above glass and a method of manufacturing of the same, a glass optical element having the above optical characteristics as well as good weatherability and a method of manufacturing the same.

27 Claims, 1 Drawing Sheet

PHOSPHATE OPTICAL GLASS, PREFORM FOR PRECISION PRESS MOLDING AND MANUFACTURING METHOD OF THE SAME, OPTICAL ELEMENT AND MANUFACTURING METHOD OF THE SAME

TECHNICAL FIELD

The present invention relates to phosphate optical glass having an Abbé number, νd, of greater than 59 and less than 70, which is suited to precision press molding, and a preform for precision press molding comprised of said glass, furthermore, a preform for precision press molding comprised of phosphate optical glass having an Abbé number, νd, of greater than 59 and a manufacturing method of the same, as well as an optical element comprised of said glass.

BACKGROUND OF THE ART

Low-dispersion glasses are useful optical glasses employed as materials in various optical elements. For example, Japanese Unexamined Patent Publication (KOKAI) Showa No. 60-171244 discloses low-dispersion glass having an Abbé number (νd) of about 60 to 73. On the other hand, the widespread popularity of image pickup devices such as digital cameras and portable telephones equipped with cameras is increasing the demand for size reduction in image pickup optical systems based on configurations of small numbers of lenses. This has been accompanied by an increase in demand for aspherical lenses.

Precision press molding is known as a method for mass producing, with good productivity, optical elements such as aspherical lenses that are expensive to manufacture by grinding and polishing. Precision press molding requires glass that softens at low temperature and has good weatherability. Conventional low-dispersion glasses have poor weatherability and cannot be employed in precision press molding.

DISCLOSURE OF THE INVENTION

Accordingly, it is an object of the present invention to provide low-dispersion phosphate optical glass having an Abbé number (νd) of greater than 59 and less than 70, having a low-temperature softening property and good weatherability, suited to precision press molding, and further having good devitrification stability suited to hot molding in which glass melt flowing out is directly formed into a preform.

A further object of the present invention is to provide a preform for precision press molding permitting the manufacturing, with good productivity by precision press molding, of optical elements having the above-stated optical characteristics, comprised of the above-described phosphate optical glass or phosphate optical glass having an Abbé number (νd) of greater than 59; a method of manufacturing the same; optical elements made of glass having the above optical characteristics and good weatherability; and a method of manufacturing the same.

Means for achieving the aforementioned objects are as follows.

[1] Phosphate optical glass having an Abbé number, νd, of greater than 59 and less than 70, comprising the following components, denoted as mass percentages:

$P_2O_5$: 18 to 70 percent, where 70 percent is excluded;
$B_2O_3$: 0 to 34 percent, where 0 percent is excluded;
$Al_2O_3$: 0 to 8 percent;
$Li_2O$: 0 to 20 percent, where 0 percent is excluded;
$Na_2O$: 0 to 18 percent;
$K_2O$: 0 to 15 percent;
MgO: 0 to 25 percent, where 0 percent is excluded;
CaO: 0 to 18 percent, where MgO+CaO>4 percent;
SrO: 0 to 20 percent;
BaO: 0 to 40 percent, where SrO+BaO>1 percent and $BaO/B_2O_3$, as a mass percentage ratio, is 0 to 15;
ZnO: 0 to 14 percent, where the ratio of ΣR"O/ΣR'O as a mass percentage ratio is less than 23, where ΣR"O=MgO+CaO+SrO+BaO+ZnO and ΣR'O=$Li_2O$+$Na_2O$+$K_2O$;
$Gd_2O_3$: 0 to 18 percent;
$Sb_2O_3$: 0 to 1 percent;

wherein the content of the component contained in the largest quantity, other than the above components, is lower than the contents of both $B_2O_3$ and $Li_2O$.

[2] Phosphate optical glass having an Abbé number, νd, of greater than 59 and less than 70, comprising the following components, denoted as mass percentages:

$P_2O_5$: 18 to 70 percent, where 70 percent is excluded;
$B_2O_3$: 0.6 to 34 percent, where $P_2O_5/B_2O_3$, as a mass percentage ratio, is 2.04 to 30;
$Al_2O_3$: 0 to 8 percent;
$Li_2O$: 0 to 20 percent, where 0 percent is excluded;
$Na_2O$: 0 to 18 percent;
$K_2O$: 0 to 15 percent;
MgO: 0 to 25 percent;
CaO: 0 to 18 percent, where MgO+CaO>4 percent;
SrO: 0 to 20 percent;
BaO: 0 to 40 percent, where SrO+BaO>1 percent and $BaO/B_2O_3$, as a mass percentage ratio, is 0 to 15;
ZnO: 0 to 14 percent, where the ratio of ΣR"O/ΣR'O as a mass percentage ratio is less than 23, where ΣR"O=MgO+CaO+SrO+BaO+ZnO and ΣR'O=$Li_2O$+$Na_2O$+$K_2O$;
$Gd_2O_3$: 0 to 18 percent;
$Sb_2O_3$: 0 to 1 percent;

wherein the content of the component contained in the largest quantity, other than the above components, is lower than the contents of both $B_2O_3$ and $Li_2O$.

[3] The phosphate optical glass according to [1] or [2], comprising the following components, denoted as mass percentages:

$P_2O_5$: 20 to 60 percent;
$B_2O_3$: 0.6 to 28 percent, where $P_2O_5/B_2O_3$, as a mass percentage ratio, is 2.1 to 30;
$Al_2O_3$: 0 to 8 percent;
$Li_2O$: 1 to 20 percent, where 1 percent is excluded;
$Na_2O$: 0 to 18 percent;
$K_2O$: 0 to 15 percent:
MgO: 0 to 25 percent, where 0 percent is excluded;
CaO: 0 to 18 percent, where MgO+CaO>4 percent;
SrO: 0 to 20 percent;
BaO: 0 to 39 percent, where SrO+BaO>1 percent and $BaO/B_2O_3$, as a mass percentage ratio, is 0 to 15;
ZnO: 0 to 14 percent, where the ratio of ΣR"O/ΣR'O as a mass percentage ratio is less than 23, where ΣR"O=MgO+CaO+SrO+BaO+ZnO and ΣR'O=$Li_2O$+$Na_2O$+$K_2O$,
$Gd_2O_3$: 0 to 18 percent;
$Sb_2O_3$: 0 to 1 percent.

[4] The phosphate optical glass according to [1] or [2], which has a refractive index, nd, ranging from 1.54 to 1.66.

[5] The phosphate optical glass according to [1] or [2], which has a yield point, Ts, of greater than 500° C. and equal to or less than 600° C.

[6] A preform for precision press molding being comprised of the phosphate optical glass according to [1] or [2].

[7] A preform for precision press molding being comprised of the phosphate optical glass having an Abbé number, vd, of greater than 59,
wherein said glass comprises essential components in the form of $P_2O_5$, $B_2O_3$, $Li_2O$, MgO, CaO, and BaO as well as exhibits a yield point, Ts, of greater than 500° C. and equal to or less than 600° C.

[8] The preform for precision press molding according to [7], wherein said glass comprises the following components, denoted as mass percentages:
$P_2O_5$: 18 to 70 percent, where 70 percent is excluded;
$B_2O_3$: 0 to 34 percent, where 0 percent is excluded;
$Li_2O$: 0 to 20 percent, where 0 percent is excluded;
MgO: 0 to 25 percent, where 0 percent is excluded;
CaO: 0 to 18 percent, where 0 percent is excluded;
SrO: 0 to 20 percent;
BaO: 0 to 40 percent, where 0 percent is excluded;
$Al_2O_3$: 0 to 8 percent;
$Na_2O$: 0 to 18 percent;
$K_2O$: 0 to 15 percent;
ZnO: 0 to 14 percent;
$Gd_2O_3$: 0 to 18 percent;
$Sb_2O_3$: 0 to 1 percent.

[9] The preform for precision press molding according to [6], which is precision press molded with a press mold made of silicon carbide.

[10] The preform for precision press molding according to [7], which is precision press molded with a press mold made of silicon carbide.

[11] A method of manufacturing a preform for precision press molding, wherein glass melt of a prescribed weight is separated from glass melt flow exiting from a outflow pipe to form a preform for precision press molding comprised of the optical glass according to [1] or [2].

[12] A method of manufacturing a preform for precision press molding, wherein glass melt of a prescribed weight is separated from glass melt flow flowing out from a outflow pipe to form the preform for precision press molding according to [6].

[13]. A method of manufacturing a preform for precision press molding, wherein glass melt of a prescribed weight is separated from glass melt flow flowing out from a outflow pipe to form the preform for precision press molding according to [7].

[14] An optical element comprised of the phosphate optical glass according to [1] or [2].

[15] A method of manufacturing an optical element by heating a glass preform to precision press mold with a press mold, wherein
said preform is the preform according to [6].

[16] A method of manufacturing an optical element by heating a glass preform to precision press mold with a press mold, wherein
said preform is the preform according to [7].

[17] A method of manufacturing an optical element by heating a glass preform to precision press mold with a press mold, wherein
said preform is a preform manufactured by the method according to [11].

[18] A method of manufacturing an optical element by heating a glass preform to precision press mold with a press mold, wherein
said preform is a preform manufactured by the method according to [12].

[19] A method of manufacturing an optical element by heating a glass preform to precision press mold with a press mold, wherein
said preform is a preform manufactured by the method according to [13].

[20] The method of manufacturing an optical element according to [16], wherein
said preform is introduced into the press mold and said mold and said preform are heated together to conduct the precision press molding.

[21] The method of manufacturing an optical element according to [17], wherein
said preform is introduced into the press mold and said mold and said preform are heated together to conduct the precision press molding.

[22] The method of manufacturing an optical element according to [18], wherein
said preform is introduced into the press mold and said mold and said preform are heated together to conduct the precision press molding.

[23] The method of manufacturing an optical element according to [19], wherein
said preform is introduced into the press mold and said mold and said preform are heated together to conduct the precision press molding.

[24] The method of manufacturing an optical element according to [16], wherein
the preheated preform is introduced into the press mold to conduct the precision press molding.

[25] The method of manufacturing an optical element according to claim 17, wherein
the preheated preform is introduced into the press mold to conduct the precision press molding.

[26] The method of manufacturing an optical element according to claim 18, wherein
the preheated preform is introduced into the press mold to conduct the precision press molding.

[27] The method of manufacturing an optical element according to claim 19, wherein
the preheated preform is introduced into the press mold to conduct the precision press molding.

Figure 1:
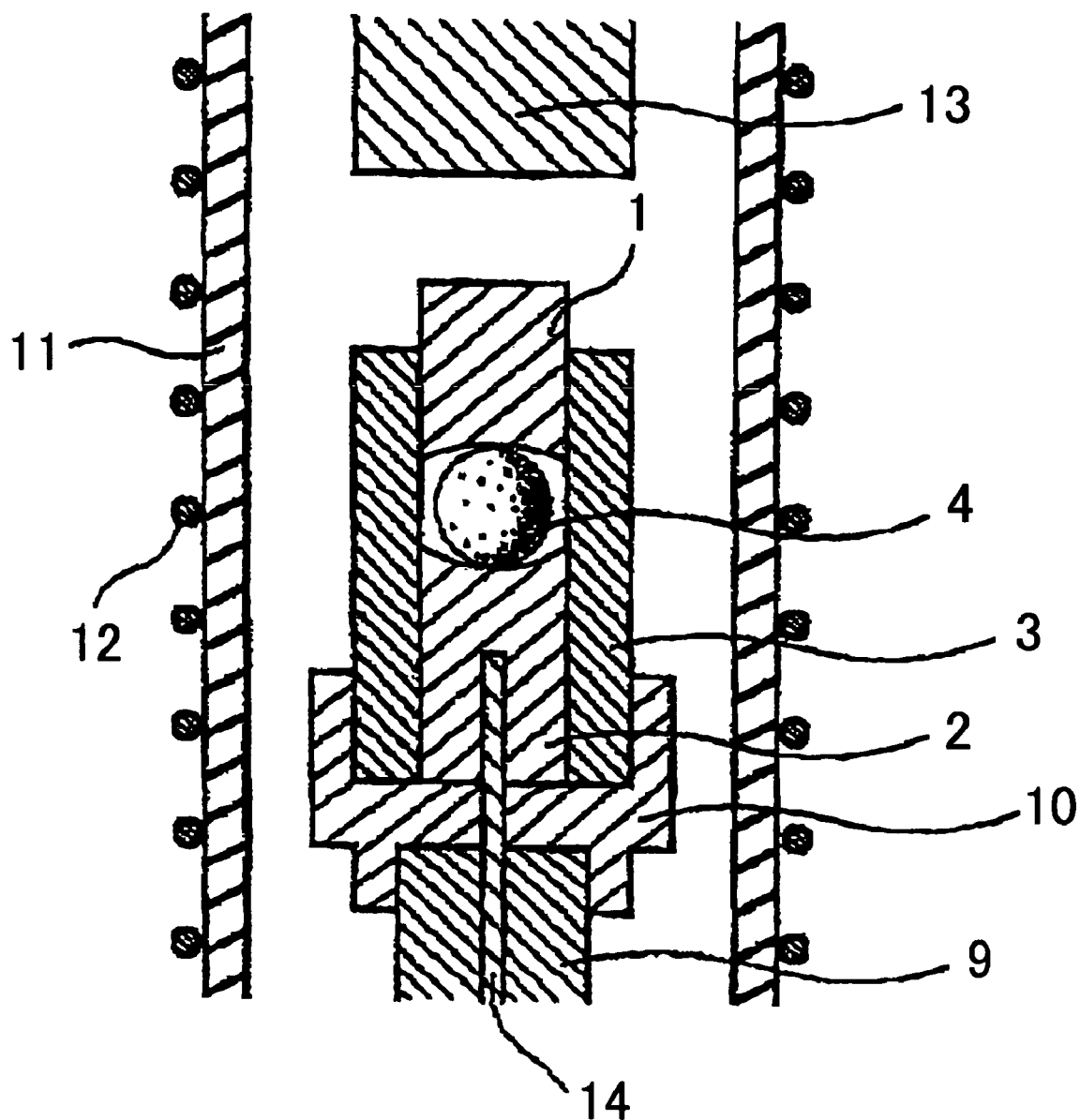
FIG. 1 is a cross-sectional explanatory drawing of a precision press apparatus.

The present invention provides phosphate optical glass having a low-dispersion property in the form of an Abbé number (vd) of greater than 59 and less than 70, as well as a low-temperature softening property and good weatherability, suited to precision press molding, and further having good devitrification stability suited to hot molding in which glass melt flowing out is directly formed into a preform.

The preform for precision glass molding of the present invention is comprised of phosphate optical glass having a low-dispersion property in the form of an Abbé number (vd) of greater than 59 and less than 70, or an Abbé number (vd) of greater than 59, having a low-temperature softening property and good weatherability, suited to precision press molding, and good devitrification stability. Thus, the preform for precision glass molding of the present invention can be manufactured with good productivity by precision press molding into optical elements having the above optical characteristics.

Since the method of manufacturing preforms for precision press molding of the present invention employs glass having a low-dispersion property in the form of an Abbé number (vd) of greater than 59, a low-temperature softening property and good weatherability, suited to precision press molding, and good devitrification stability, it permits the stable manufacturing of preforms directly from glass melt flowing out and thus permits the manufacturing of high-quality preforms with good productivity.

Further, the present invention provides an optical element made of glass having a low-dispersion property in the form of an Abbé number (vd) of greater than 59 and good weatherability.

The method of manufacturing optical elements of the present invention permits the manufacturing of optical elements made of glass having a low-dispersion property in the form of an Abbé number (vd) of greater than 59 and good weatherability, including optical elements that are difficult to achieve high productivity by mechanical processing, such as aspherical lenses, with good productivity based on precision press molding.

The phosphate optical glass, preform for precision press molding, method of manufacturing the same, optical element and method of manufacturing the same of the present invention will be described below.

(Phosphate Optical Glass)

The phosphate optical glass of the first aspect of the present invention (referred to hereinafter as "glass I") is phosphate optical glass having an Abbé number, vd, of greater than 59 and less than 70, comprising the following components, denoted as mass percentages:

$P_2O_5$: 18 to 70 percent, where 70 percent is excluded;
$B_2O_3$: 0 to 34 percent, where 0 percent is excluded;
$Al_2O_3$: 0 to 8 percent;
$Li_2O$: 0 to 20 percent, where 0 percent is excluded;
$Na_2O$: 0 to 18 percent;
$K_2O$: 0 to 15 percent;
MgO: 0 to 25 percent, where 0 percent is excluded;
CaO: 0 to 18 percent, where MgO+CaO>4 percent;
SrO: 0 to 20 percent;
BaO: 0 to 40 percent, where SrO+BaO>1 percent and $BaO/B_2O_3$, as a mass percentage ratio, is 0 to 15;
ZnO: 0 to 14 percent, where the ratio of ΣR"O/ΣR'O as a mass percentage ratio is less than 23, where ΣR"O=MgO+CaO+SrO+BaO+ZnO and ΣR'O=$Li_2O$+$Na_2O$+$K_2O$;
$Gd_2O_3$: 0 to 18 percent;
$Sb_2O_3$: 0 to 1 percent;

wherein the content of the component contained in the largest quantity, other than the above components, is lower than the contents of both $B_2O_3$ and $Li_2O$.

The phosphate optical glass of the second aspect of the present invention (referred to hereinafter as "glass II") is phosphate optical glass having an Abbé number, vd, of greater than 59 and less than 70, comprising the following components, denoted as mass percentages:

$P_2O_5$: 18 to 70 percent, where 70 percent is excluded;
$B_2O_3$: 0.6 to 34 percent, where $P_2O_5/B_2O_3$, as a mass percentage ratio, is 2.04 to 30;
$Al_2O_3$: 0 to 8 percent;
$Li_2O$: 0 to 20 percent, where 0 percent is excluded;
$Na_2O$: 0 to 18 percent;
$K_2O$: 0 to 15 percent;
MgO: 0 to 25 percent;
CaO: 0 to 18 percent, where MgO+CaO>4 percent;
SrO: 0 to 20 percent;
BaO: 0 to 40 percent, where SrO+BaO>1 percent and $BaO/B_2O_3$, as a mass percentage ratio, is 0 to 15;
ZnO: 0 to 14 percent, where the ratio of ΣR"O/ΣR'O as a mass percentage ratio is less than 23, where ΣR"O=MgO+CaO+SrO+BaO+ZnO and ΣR'O=$Li_2O$+$Na_2O$+$K_2O$;
$Gd_2O_3$: 0 to 18 percent;
$Sb_2O_3$: 0 to 1 percent;

wherein the content of the component contained in the largest quantity, other than the above components, is lower than the contents of both $B_2O_3$ and $Li_2O$.

The components $P_2O_5$, $B_2O_3$, and $Li_2O$, functioning advantageously to reduce dispersion, are jointly present in the optical glass of the present invention. Bivalent components are further incorporated to enhance the weatherability of the glass. Among bivalent components, those advantageous for enhancing weatherability and devitrification stability and for increasing the refractive index are BaO and SrO, which have relatively large ionic radii. Thus, along with $P_2O_5$, $B_2O_3$, and $Li_2O$, at least one bivalent component from among BaO and SrO is incorporated as an essential component.

Listed in descending order of advantage afforded in reducing dispersion, the bivalent components are MgO, CaO, SrO, BaO, and ZnO. Using BaO and SrO as the only bivalent components does not facilitate the object of reducing dispersion. Accordingly, the object of reducing dispersion is achieved by incorporating at least one from among MgO and CaO as a bivalent component in addition to either BaO or SrO.

MgO, an effective bivalent component for reducing dispersion, is incorporated in glass I as an essential component to increase the flexibility with respect to the incorporation amount of $B_2O_3$, one of components forming a network structure. In glass II, the mass ratio of the quantities of glass network structure forming components $P_2O_5$ and $B_2O_3$ incorporated is limited to a prescribed range, so that MgO is an optional component.

ZnO is another optional bivalent component. $Al_2O_3$, $Na_2O$, $K_2O$, and $Gd_2O_3$ are also incorporated as optional components to enhance devitrification stability, weatherability, melting properties, and the clarifying effect, and to adjust optical characteristics. $Sb_2O_3$ is optionally incorporated as a clarifying agent.

In particular, the thermal stability of the glass is desirably increased to achieve material characteristics such as low dispersion, high weatherability, and a higher refractive index. Thus, in the present invention, it is desirable to blend a relatively large variety of glass components into the glass so that the content of no single component is excessive. Incorporating a variety of glass components delays the rate at which crystal seeds of any one component precipitate out, effectively increasing the thermal stability of the glass and simultaneously achieving the various characteristics mentioned above. Thus, as described further below, with respect to bivalent components, it is desirable to incorporate not less than a certain quantity of MgO and CaO into the optical glass of the present invention relative to BaO and SrO, for example.

Thus, the optical glass of the present invention was devised by optimizing the quantities of various components incorporated to achieve the objects of the present invention.

The reasons for limiting the composition ranges of glasses I and II will be described below. Unless specifically stated otherwise, the various contents are denoted as mass percentages. Unless specifically stated otherwise, the reasons for limiting the composition ranges are identical for glasses I and II.

$P_2O_5$, a network structure forming component in the glass, is an essential component for imparting the stability required for manufacturing to the glass. However, when the content thereof is equal to or greater than 70 percent, the glass transition temperature and yield point increase, thereby raising the press molding temperature, lowering the refractive index, and decreasing weatherability. At less than 18 percent, the glass tends strongly to devitrify and becomes unstable. Thus, the $P_2O_5$ content of the glass of the present invention is set to 18 to 70 percent (excluding 70 percent), preferably 20 to 60 percent, and more preferably, 24 to 58 percent.

$B_2O_3$ is an essential component of the glass of the present invention. $B_2O_3$ is a component that is extremely effective in improving the melt properties of the glass, homogenizing the glass, and improving glass durability. However, the incorporation of an excessive amount of $B_2O_3$ compromises the low dispersion property of the glass. Thus, in glass I, the quantity incorporated is set to 0 to 34 percent (excluding 0 percent), and in glass II, to the range of 0.6 to 34 percent. In both glasses I and II, the quantity of $B_2O_3$ incorporated is preferably 0.6 to 28 percent, more preferably greater than 3 percent and less than or equal to 28 percent, further preferably, greater than 4 percent and less than or equal to 28 percent, and still more preferably, greater than 4 percent and less than or equal to 25 percent.

As set forth above, MgO is incorporated as an essential component that, among the bivalent components, effectively lowers dispersion in glass I, thereby increasing the flexibility with respect to the incorporation quantity of $B_2O_3$, one of components forming a network structure. MgO is rendered an optional component in glass II by setting the mass ratio of the quantity of $P_2O_5$ and $B_2O_3$ incorporated to within a prescribed range, these components forming a network structure in the glass. That is, in glass II, to both impart low dispersion to the glass and inhibit glass phase splitting to obtain uniform glass, within the above-stated ranges of the contents of $P_2O_5$ and $B_2O_3$, the ratio $P_2O_5/B_2O_3$ (by mass) of the $P_2O_5$ content to the $B_2O_3$ content is set to 2.04 to 30. The ratio $P_2O_5/B_2O_3$ is preferably 2.1 to 30, more preferably 2.1 to 25, and further preferably, 2.2 to 15. Balancing the proportions of $P_2O_5$ and $B_2O_3$ increases the refractive index, reduces dispersion, and achieves good weatherability, stability, and melt properties. In glass II, the ratio $P_2O_5/B_2O_3$ (mole ratio) of the $P_2O_5$ content to the $B_2O_3$ content in the glass is preferably greater than 1 and less than 15.

On the other hand, due to incorporating MgO in glass I as an essential component that effectively reduces dispersion in the glass as set forth further below, the ratio $P_2O_5/B_2O_3$ (by mass) is not limited to 2.04 to 30. However, even in glass I, the ratio $P_2O_5/B_2O_3$ (by mass) is preferably set to 2.04 to 30, more preferably 2.1 to 30, further preferably 2.1 to 25, and still more preferably, 2.2 to 15.

$Al_2O_3$ is not an essential component of the glass of the present invention. However, it is employed as a component that effectively enhances the weatherability of the glass. However, when the quantity incorporated exceeds 8 percent, the glass transition temperature and yield point increase, the stability and high-temperature melt property of the glass deteriorate, and there is a risk of the refractive index decreasing. Thus, the quantity incorporated is set to 0 to 8 percent, preferably 0 to 6 percent, more preferably 0 to 5 percent.

$Li_2O$, an essential component of the glass of the present invention, is incorporated to lower the glass transition temperature, yield point, and press molding temperature. In particular, as set forth above, it is extremely important for $P_2O_5$, $B_2O_3$, and $Li_2O$ to be present in combination to lower the dispersion of the glass. However, the introduction of an excessive amount compromises glass weatherability and stability and presents the risk of a sharp drop in the refractive index. Thus, the quantity incorporated is set to the range of 0 to 20 percent (excluding 0 percent), preferably greater than 1 percent to 20 percent, more preferably 1.5 to 15 percent, and further preferably, greater than 2.5 percent to 10 percent.

Both $Na_2O$ and $K_2O$ are optional components incorporated to enhance glass devitrification properties; lower the glass transition temperature, yield point, and liquid phase temperature; and improve the high-temperature melt property of the glass. The incorporation of suitable quantities of $Na_2O$ and $K_2O$ improves the stability of the glass and permits a decrease in the liquid phase temperature and transition temperature. However, when an excessive quantity is incorporated, not only does the stability of the glass deteriorate, but weatherability is severely compromised and the refractive index drops. Accordingly, in the glass of the present invention, the quantity of $Na_2O$ incorporated is set to within a range of 0 to 18 percent, preferably 0 to 15 percent, more preferably 0 to 10 percent, and further preferably, 0 to 9 percent, and the quantity of $K_2O$ incorporated is set to within a range of 0 to 15 percent, preferably 0 to 12 percent, more preferably 0 to 4.5 percent, and further preferably, 0 to 4 percent. The preferred range of the $Na_2O$ content denoted as a mole percentage is 0 to 9 mole percent, preferably 0 to 7 mole percent. When $Li_2O+Na_2O+K_2O$ is less than 1 percent, the glass yield point rises and there is a risk of not being able to conduct good precision press molding. Thus, this sum is preferably set to greater than 1 percent, more preferably greater than 2 percent, and further preferably, greater than 2.5 percent. The incorporation of alkali metal oxides such as $Li_2O$, $Na_2O$, and $K_2O$ lowers the liquid phase temperature and enhances moldability of the glass melt, and is thus desirable from the perspective of hot molding of preforms.

In the glass of the present invention, the incorporation of an alkali metal oxide in the form of $Cs_2O$ is unnecessary. $Cs_2O$ severely compromises weatherability, so the incorporation of $Cs_2O$ into the glass of the present invention is undesirable.

MgO is an essential component of glass I and an optional component of glass II that is incorporated to achieve both high glass weatherability and low dispersion. The incorporation of a small quantity of MgO has the effects of lowering the glass transition temperature, yield point, or liquid phase temperature. However, the incorporation of a large quantity severely compromises glass devitrification stability and presents the risk of raising the liquid phase temperature. Thus, the quantity incorporated is set to a range of greater than 0 percent and less than or equal to 25 percent for glass I and 0 to 25 percent for glass II. The MgO content of glasses I and II is preferably 1 to 20 percent, more preferably 2 to 15 percent. In a manner similar to $B_2O_3$ and $Li_2O$, MgO advantageously functions to decrease the dispersion of the glass. Thus, the desired dispersion can be achieved without losing various required characteristics in precision press molding and hot molding of preforms. Therefore, in the glass of the present invention, at least one from among MgO, $B_2O_3$, and $Li_2O$ is preferably incorporated in a quantity exceeding 4 percent, more preferably 4.1 percent or greater, and, particularly to impart low dispersion to the glass, greater than 5 percent.

CaO is an optional component employed to improve glass stability and lower the liquid phase temperature. However, the incorporation of an excessive quantity of CaO not only compromises the durability of the glass, but also presents the risk of lowering the refractive index. Thus, in the glass of the present invention, the quantity incorporated is set to within a range of 0 to 18 percent, preferably 1 to 18 percent, more preferably 2 to 18 percent, further preferably, greater than 4 percent but not greater than 15 percent, and even more preferably, 4.5 to 12 percent. Glass incorporating both MgO and CaO (in which MgO and CaO are jointly present as glass components) is desirable from the perspectives of enhancing glass stability, lowering the liquid phase temperature, improving weatherability, and maintaining low dispersion. When both MgO and CaO are incorporated, the individual quantities of MgO and CaO that are incorporated remain as given in the desirable ranges stated above.

To achieve low dispersion, stability, and weatherability in both glasses I and II, the quantities of MgO and CaO incorporated are set so that the total quantity of MgO and CaO (MgO+CaO) exceeds 4 percent, is preferably 5 percent or more, and is more preferably 7 to 25 percent.

SrO is a component that is effective for raising the refractive index of the glass without compromising the low dispersion characteristic of the glass. It is a particularly effective component for increasing the weatherability of the glass. However, when an excessive amount of SrO is incorporated, the stability of the glass deteriorates and the liquid phase temperature rises. Thus, in the glass of the present invention, the quantity of SrO incorporated is set to within a range of 0 to 20 percent, preferably 0 to 15 percent, and more preferably 0 to 10 percent.

When incorporated in suitable quantity, BaO is an extremely effective component for raising the refractive index and enhancing the devitrification stability of the glass. In particular, it is the most effective component for increasing the weatherability of the glass. However, the incorporation of an excessive quantity of BaO is disadvantageous in that the devitrification stability of the glass is severely compromised, the glass transition temperature rises, and the low dispersion characteristic is lost. Accordingly, in the glass of the present invention, the quantity incorporated is set to within a range of 0 to 40 percent, preferably 0 to 39 percent, and more preferably, 1 to 38 percent. In the glass of the present invention, the quantities of SrO and BaO incorporated fall within the above-stated ranges and the total quantity (SrO+BaO) exceeds 1 percent, is preferably greater than or equal to 2 percent, and more preferably falls within a range of 3 to 40 percent to enhance the weatherability of the glass.

From the viewpoint of enhancing the stability of the glass, the ratio of the total quantity (MgO+CaO) of MgO and CaO to the total quantity (SrO+BaO) of SrO and BaO, that is, (MgO+CaO)/(SrO+BaO) (mass ratio), is preferably 0.11 to 40, more preferably 0.16 to 30, further preferably, 0.21 to 25, and still more preferably, 0.26 to 20. Thus, in the glass of the present invention, the quantities of the individual components are desirably set within the above-stated ranges while satisfying this mass ratio.

To lower dispersion and increase the stability of the glass, the quantities of BaO and $B_2O_3$ incorporated are set so that the ratio $BaO/B_2O_3$ (mass ratio) of the BaO content to the $B_2O_3$ content, while falling within the above-stated range, falls within a range of 0 to 15, preferably 0 to 12, and more preferably, 0 to 10 in the glass of the present invention.

ZnO is an optional component employed to improve the stability and lower the liquid phase temperature of the glass. However, when an excessive quantity of ZnO is incorporated, not only does durability deteriorate, but there is a risk of high dispersion. Accordingly, in the glass of the present invention, the quantity of ZnO incorporated is set to a range of 0 to 14 percent. In the glass of the present invention, when attempting to further reduce dispersion and improve the stability of the glass, the quantity of ZnO incorporated is preferably set to 0 to 6 percent (excluding 6 percent), more preferably 0 to 5 percent, and further preferably, 0 to 3 percent. ZnO, an optional component, is desirably not incorporated when attempting to achieve particularly low dispersion.

The total quantity (MgO+CaO+SrO+BaO+ZnO) of MgO, CaO, SrO, BaO, and ZnO is preferably greater than or equal to 10 percent, more preferably greater than or equal to 20 percent, to increase the durability of the glass and achieve desired optical characteristics. Thus, in the glass of the present invention, the quantities of the individual components incorporated are desirably set within the above-stated ranges, and the total quantity of these components is desirably set within the above-stated range.

The total quantity ratio (MgO+CaO+SrO+BaO+ZnO)/($Li_2O+Na_2O+K_2O$) (mass ratio) of the total quantity of MgO, CaO, SrO, BaO, and ZnO to the total quantity of $Li_2O$, $Na_2O$, and $K_2O$ is set to less than 23 to further lower the precision press molding temperature. In the glass of the present invention, the quantities of the individual components incorporated are set within the above-stated ranges and to satisfy this total quantity mass ratio. The above mass ratio is preferably less than or equal to 22, more preferably falling within the range of 2 to 20.

$Gd_2O_3$ is an optional element capable of greatly improving the weatherability and refractive index of the glass. However, the incorporation of an excessive quantity of $Gd_2O_3$ runs the risk of degrading the stability of the glass. Thus, the quantity incorporated is set to 0 to 18 percent, preferably 0 to 14 percent, and more preferably to 0 to 10 percent.

$Sb_2O_3$ is an effective clarifying agent. However, when added in a quantity exceeding 1 percent, the glass tends to develop bubbles during precision press molding. Further, since Sb is highly oxidative, the addition of an excessive quantity of $Sb_2O_3$ tends to damage the molding surface of the press mold. Accordingly, the quantity of $Sb_2O_3$ incorporated in the glass of the present invention is set to 0 to 1 percent, preferably 0 to 0.6 percent.

The glass of the present invention is desirably basically comprised of $P_2O_5$, $B_2O_3$, $Al_2O_3$, $Li_2O$, $Na_2O$, $K_2O$, MgO, CaO, SrO, BaO, ZnO, $Gd_2O_3$, and $Sb_2O_3$. The total quantity of these components in the glass of the present invention preferably exceeds 95 percent, more preferably exceeds 98 percent, further preferably exceeds 99 percent, and still more preferably is 100 percent.

The optical glass of the present invention is basically comprised of the above-stated components, but additional components can be incorporated. In that case, the quantity of the additional component contained in the largest amount, other than the above components, is lower than both the quantity of $B_2O_3$ and the quantity of $Li_2O$ incorporated.

For example, $Y_2O_3$ can be incorporated as a component capable of improving the weatherability and refractive index of the glass. However, the incorporation of an excessive quantity of $Y_2O_3$ runs the risk of degrading the stability of the glass. Thus, even when the quantity of $B_2O_3$ and the quantity of $Li_2O$ incorporated are each 1 percent or greater, the quantity of $Y_2O_3$ incorporated is desirably less than 1 percent; when there is a strong concern for preventing a reduction in the stability of the glass, none is desirably added.

$SiO_2$ has the effect of lowering the liquid phase temperature of the glass and enhancing stability when added in a small quantity, and can be incorporated in a manner satisfying the relation with the quantities of $B_2O_3$ and $Li_2O$ incorporated. For example, the quantity incorporated can fall within the range of 0 to 2 percent, with less than or equal to 1 percent being desirable, and no incorporation being preferred.

$Nb_2O_5$ functions to increase dispersion. Thus, even when the quantity of $B_2O_3$ and the quantity of $Li_2O$ incorporated are each 2 percent or greater, the quantity of $Nb_2O_5$ incorporated is preferably kept to less than 2 percent, more preferably less than or equal to 1 percent, and further preferably, none is added at all.

One or more components selected from among the group consisting of $Yb_2O_3$, $Lu_2O_3$, $ZrO_2$, $Ta_2O_5$, $Bi_2O_3$, $WO_3$, and $TiO_2$ can be incorporated within a range that does not compromise the object of the present invention.

However, $La_2O_3$ is an unnecessary component. The incorporation of only a small quantity sharply degrades the stability of the glass and diminishes melt properties, so the omission of this component is desirable. SnO sharply increases dispersion of the glass, and is thus preferably not incorporated.

In the glass of the present invention, there is no need to incorporate fluorine. When hot molding a preform containing fluorine, volatization of the fluorine causes small irregularities to form on the surface of the preform and striae tend to form. Thus, no fluorine is desirably incorporated.

Compounds of Te, Pb, Cd, Tl, and As are desirably not incorporated out of concern for the environment. Further, when conducting precision press molding in a non-oxidizing atmosphere or reducing atmosphere, Ag compounds tending to precipitate as metals due to reduction are also desirably not incorporated.

The introduction of Nd, Er, Pr, and the like is unnecessary except when producing light-emitting elements. The introduction of substances serving as sources of light such as phosphorescence is also undesirable except when producing light-emitting elements or the like.

The preferred composition ranges of the glass of the present invention, denoted as mass percentages, are: 20 to 60 percent $P_2O_5$, 0.6 to 28 percent $B_2O_3$ (where $P_2O_5/B_2O_3$ (mass percentage ratio) is 2.1 to 30), 0 to 8 percent $Al_2O_3$, 1 to 20 percent (excluding 1 percent) $Li_2O$, 0 to 18 percent $Na_2O$, 0 to 15 percent $K_2O$, 0 to 25 percent (excluding 0 percent) MgO, 0 to 18 percent CaO (where MgO+CaO>4 percent), 0 to 20 percent SrO, 0 to 39 percent BaO (where SrO+BaO>1 percent and $BaO/B_2O_3$ (mass percentage ratio) is 0 to 15), 0 to 14 percent ZnO (where the ratio of $\Sigma R''O/\Sigma R'O$ as a mass percentage is less than 23, where $\Sigma R''O=$(MgO+CaO+SrO+BaO+ZnO) and $\Sigma R'O=(Li_2O+Na_2O+K_2O)$), 0 to 18 percent $Gd_2O_3$, and 0 to 1 percent $Sb_2O_3$.

Therein, 1 to 25 percent MgO and 1 to 39 percent BaO are preferred.

The following three types of glass are examples of further desirable forms of the glass of the present invention based on targeted characteristics.

By incorporating less BaO, that is, 1 to 20 mass percent (excluding 20 percent), desirably 1 to 18 mass percent, the first type of glass achieves lower dispersion and better weatherability. The first type of glass preferably comprises greater than 5 mass percent, more preferably greater than or equal to 7 mass percent, of $B_2O_3$. The quantity of MgO incorporated is preferably greater than 5 mass percent, more preferably greater than or equal to 6 mass percent.

By incorporating relatively more BaO and having a mass ratio ($P_2O_5/BaO$) of the $P_2O_5$ content to the BaO content of less than 1, the second type of glass achieves a higher refractive index and better weatherability. The second type of glass preferably comprises less than 37 mass percent (less than 28 mole percent) of $P_2O_5$ and less than or equal to 40 mass percent of BaO, more preferably less than or equal to 36 mass percent (less than or equal to 27 mole percent) of $P_2O_5$ and from 20 mass percent to not more than 38 mass percent of BaO.

By incorporating relatively more BaO, having a mass ratio ($P_2O_5/BaO$) of the $P_2O_5$ content to the BaO content of equal to or greater than 1, and incorporating relatively more $P_2O_5$ than the second type of glass, the third type of glass achieves a higher refractive index and better weatherability and stability.

In the third type of glass, the $P_2O_5$ content is preferably less than 48 mass percent, more preferably less than 45 mass percent, further preferably less than 42 mass percent (less than 28 mole percent), and still more preferably from 24 to 38 mass percent (18 to 27 mole percent). The BaO content is preferably less than 40 mass percent, more preferably from 20 to 38 mass percent. In the third type of glass, the ZnO content is preferably less than 6 mass percent, more preferably less than or equal to 4 mass percent, and further preferably less than or equal to 2 mass percent. To achieve lower dispersion characteristics, ZnO may be omitted.

Based on the characteristics being emphasized, a selection may be made from among the first through third glasses set forth above.

The optical glass of the present invention has high thermal stability at the pressing temperature.

The thermal stability of the glass of the present invention at the pressing temperature may be evaluated in the following manner.

For example, the glass of the present invention is cast into a casting mold while in a molten state in air and a molded glass article having a flat, free surface is fabricated. The term "free surface" means a surface formed without transfer of the press mold surface. This molded glass article is cut to prepare $1 \times 1 \times 2$ cm$^3$ rectangular parallelepiped glass samples. The cutting is conducted so that one of the surfaces of the samples ($1 \times 2$ cm$^2$) becomes part of the free surface. Glass having 10 or fewer crystal grains 100 nm or larger in size per cm$^3$, preferably not more than one such crystal grain per cm$^3$, and more preferably, no such crystal grains within the glass when the glass samples are heated to 610° C., which is about 10 to 40° C. higher than the pressing temperature, at a rate of 30° C./minute, maintained at that temperature for about 10 minutes, and cooled (referred to as heat treatment A), is desirable. Since glass not exhibiting defects such as crystal precipitation or clouding in the free surface portion of the glass is desirable, glass exhibiting few crystal nuclei precipitating on the free surface following heat treatment A is desirable. Specifically, glass having an average density of crystal grains 0.1 to 30 μm in diameter of $1 \times 10^5$ grains/cm$^2$ or less is desirable, glass having an average density of crystal grains 0.1 to 100 μm in diameter of $1 \times 10^4$ grains/cm$^2$ is preferred, glass having an average density of crystal grains 0.1 to 300 μm in diameter of $1 \times 10^3$ grains/cm$^2$ or less is of greater preference, glass having an average density of crystal grains 0.1 to 1,000 μm in diameter of $1 \times 10^2$ grains/cm$^2$ or less is of still greater preference, and glass having an average density of crystal grains 0.1 to 3,000 μm in diameter of 0 to 10 grains/cm$^2$ is of particular preference.

(Optical Characteristics)

The glass of the present invention has an Abbé number (vd) of greater than 59 and less than 70, preferably 60 to 69, and more preferably 62 to 68. The refractive index (nd) preferably falls within a range of 1.54 to 1.66. The composition of the glass of the present invention can be suitably established within the above-stated ranges to satisfy these characteristics. Incorporating the various components within the above-stated desirable ranges yields glass exhibiting low dispersion characteristics and a relatively high refractive index.

(The Glass Transition Temperature and Yield Point)

The glass transition temperature (Tg) of the glass of the present invention is preferably less than or equal to 530° C., more preferably less than or equal to 500° C. The yield point (Ts) is preferably less than or equal to 600° C., more preferably less than or equal to 570° C., and further preferably, less than or equal to 540° C. Such low-temperature softening properties make it possible to keep the temperature during precision press molding relatively low. The composition of the glass of the present invention can be suitably established within the above-stated ranges to achieve the above-stated glass transition temperature (Tg) and yield point (Ts).

In the composition system of the glass of the present invention, there is a tendency for the stability of the glass to decrease when the yield point is lowered; for example, the glass surface tends to cloud up due to heating during precision press molding. To eliminate such clouding, the glass surface must be polished. However, the precision press molding method is no longer advantageous when this occurs. Accordingly, consideration of the stability of the glass is particularly important in glass employed in precision press molding. From this perspective, the desirable range of the yield point, taking into account the glass stability and the temperature during precision press molding, is preferably greater than 500° C. and less than or equal to 600° C., more preferably 505 to 600° C., further preferably 510 to 600° C., still more preferably 510 to 570° C., and even more preferably 510 to 540° C.

(The Liquid Phase Temperature and Viscosity at the Liquid Phase Temperature)

The liquid phase temperature is one indicator of glass stability. The glass of the present invention preferably has a liquid phase temperature of less than or equal to 950° C., more preferably less than or equal to 930° C., and further preferably, less than or equal to 900° C. Use of the glass of the present invention having such high stability permits the separation of a gob of glass melt required for one preform from the glass melt and the forming of a preform for press molding without devitrification while the glass is at an elevated temperature above its softening point. In the glass of the present invention, the composition can be suitably established within the above-stated ranges to achieve the above-stated liquid phase temperature.

From the perspective of providing an optical glass suited to forming of the above-described preform, the optical glass of the present invention desirably has a viscosity of 2 to 20 dPa·s at the liquid phase temperature.

(Weatherability)

The weatherability of the glass can be evaluated, for example, by maintaining glass that has been optically polished on two surfaces in a clean thermo-hygrostat at a temperature of 65° C. and a humidity of 90 percent for one week and determining the extent of the alteration layer and precipitates forming on the polished surfaces of the glass as the ratio of scattered light to transmitted light (haze value) when white light is transmitted vertically onto the glass. Glasses with high haze values have high rates of corrosion due to adhesion to the glass by water droplets and water vapor and various chemical components such as gases in the use environment, and high rates of generation of reaction products on the surface of the glass, and are thus of low chemical durability. When such glasses are employed in optical elements, corrosion of the glass and products forming on the surface of the glass run the risk of generating foreign matter on the surface of the optical glass elements and degrading optical characteristics such as transmittance. Thus, such glasses are undesirable as optical glass compositions. In particular, when preparing preforms for precision press molding, the generation of an alteration layer on the surface negatively affects precision press molding. Thus, great care must be exercised to achieve weatherability of the glass when employed in the above applications. From this perspective, the haze value of the glass of the present invention is preferably less than or equal to 0.20 (20 percent), more preferably less than or equal to 12 percent, further preferably less than or equal to 6 percent, and still more preferably less than or equal to 3 percent.

(Method of Manufacturing Optical Glass)

The optical glass of the present invention can be manufactured by heating and melting glass starting materials. $H_3PO_4$, metaphosphate, dipotassium pentoxide, and the like may be suitably employed as starting materials for $P_2O_5$; $H_3BO_3$, $B_2O_3$, $BPO_4$, and the like as starting materials for $B_2O_3$; and carbonates, nitrates, oxides, and the like as starting materials for other components. These starting materials are weighed out in prescribed proportions and mixed to obtain a blended starting material. This is then charged to a melting furnace heated to 1,000 to 1,250° C., for example; melted, clarified, and stirred; and homogenized to obtain a uniform glass melt free of bubbles and unmelted material. The glass melt is molded and slowly cooled to obtain the phosphate optical glass of the present invention.

(Preform for Precision Press Molding and Method for Manufacturing Same)

The preform for precision press molding (referred to hereinafter as the "preform") and the method of manufacturing the same of the present invention will be described below. A preform is a molded glass article of equal weight to a precision press molded article. The preform is formed to a shape suited to the shape of the precision press molded article. Examples of such shapes are spherical and spheroidal shapes. The preform is heated to impart a viscosity permitting precision press molding and supplied to precision press molding.

The first aspect of the preform of the present invention is comprised of the above-described phosphate optical glass of the present invention.

The second aspect of the preform of the present invention is a preform for precision press molding comprised of phosphate optical glass having an Abbé number (vd) of greater than 59. This glass comprises essential components in the form of $P_2O_5$, $B_2O_3$, $Li_2O$, MgO, CaO, and BaO as well as exhibits a yield point (Ts) exceeding 500° C. but not greater than 600° C.

The surface of either of these preforms may be provided with a thin film such as a mold release film as needed. These preforms permit precision press molding of optical elements having desired optical constants and are comprised of glasses having good weatherability, so the surface of the preforms tends not to deteriorate during storage. In precision press molding, the molding surface of the press mold is precisely transferred to mold the optically functional surfaces of optical elements without mechanical processing. Were the surface of a preform supplied to precision press molding to deteriorate and an optically functional surface to be transferred to the deteriorated surface thereof, the optical element would become a defective product because the deteriorated portion could not be removed by mechanical processing following precision press molding. However, since the surface of the preform is maintained in a good state, this problem is prevented. Further, due to good weatherability, the weatherability of the optical element obtained by precision press molding of the preform is also good, permitting the supplying of optical elements of high reliability for extended periods.

The glass constituting the second aspect of the preform desirably comprises, denoted as mass percentages:
$P_2O_5$: 18 to 70 percent (excluding 70 percent);
$B_2O_3$: 0 to 34 percent (excluding 0 percent);
$Li_2O$: 0 to 20 percent (excluding 0 percent);
MgO: 0 to 25 percent (excluding 0 percent);
CaO: 0 to 18 percent (excluding 0 percent);
SrO: 0 to 20 percent;
BaO: 0 to 40 percent (excluding 0 percent);
$Al_2O_3$: 0 to 8 percent;
$Na_2O$: 0 to 18 percent;
$K_2O$: 0 to 15 percent;
ZnO: 0 to 14 percent;
$Gd_2O_3$: 0 to 18 percent;
$Sb_2O_3$: 0 to 1 percent.

Specifically, the above glass is as described above for the glass of the present invention.

The method of manufacturing preforms of the present invention is a method in which glass melt of a prescribed weight is separated from glass melt flow flowing out from a outflow pipe to mold the preform for precision press molding, which is comprised of the optical glass of the present invention; this is one method of manufacturing the preform of the present invention as described above. One specific example is a method in which glass melt gob of a prescribed weight is separated from glass melt flow flowing out to form the preform comprised of the glass of the present invention having the above weight in the course of cooling the glass gob.

The above method is characterized in that mechanical processing such as cutting, grinding, and polishing is unnecessary. Mechanically processed preforms require annealing prior to mechanical processing to reduce glass distortion to a degree at which damage does not occur. However, in the above-described method of manufacturing preforms, damage-preventing annealing is unnecessary. It is also possible to form preforms with smooth surfaces.

In the above-described method of manufacturing preforms, from the perspective of imparting smooth and clean surfaces, the preform is desirably formed in a floating state achieved by wind pressure. Further, preforms comprising free surfaces are desirable. Still further, preforms free of cutting marks known as shear marks are also desirable. Shear marks are produced when an outflowing glass melt is cut with a cutting blade. When shear marks remain at the stage where the preform has been molded into a precision press molded article, that portion is defective. Thus, shear marks are desirably eliminated at the preform stage. Methods of glass melt separation that do not produce shear marks and do not employ cutting blades include the method of dripping the glass melt from the outflow pipe, and the method of supporting the front portion of a glass melt flow flowing out from an outflow pipe and removing the support at a timing permitting the separation of a glass melt gob of prescribed weight (the drop-cut method). In the drop-cut method, the glass is separated at a constricted portion produced between the front end side of the glass melt flow and the outflow pipe side, making it possible to obtain a glass melt gob of prescribed weight. Next, while the glass melt gob that has been obtained is in a softened state, it is molded to a suitable shape for feeding in press molding.

In the above-described method of manufacturing preforms, a glass melt gob corresponding to a single preform is separated and the preform is formed while the glass gob is at a high temperature at or above the softening point of the glass. However, it is also possible to cause the glass melt to flow into a casting mold, mold a molded glass article comprised of the above-described optical glass, and mechanically process the molded glass article to obtain a preform of desired weight. The glass is desirably annealed prior to mechanical processing to adequately eliminate distortion so that the glass will not be damaged.

(Optical Element and Method of Manufacturing the Same)

The optical element of the present invention is comprised of the above-described phosphate optical glass of the present invention.

In the optical element of the present invention, since the glass constituting the optical element is imparted with the various above-described characteristics, it is possible to achieve desired optical constants and good weatherability, and maintain high reliability over extended periods.

Examples of the optical element of the present invention are various types of lenses such as spherical lenses, aspherical lenses, and microlenses; diffraction gratings, lenses with diffraction gratings, lens arrays, and prisms. This optical element is desirably obtainable by heating and softening the preform of the present invention, followed by precision press molding.

As needed, optical thin films such as antireflective films, fully reflective films, partially reflective films, and films having spectroscopic characteristics can be provided on the optical element.

The method of manufacturing the optical element will be described below.

The method of manufacturing an optical glass of the present invention can be a method of manufacturing an optical element by heating a glass preform to precision press mold with a press mold, wherein said preform is the aforementioned preform of the present invention or a preform manufactured by the aforementioned method of the present invention.

Precision press molding is also called mold optics molding, and is already well known in the field of art to which the present invention belongs.

A surface that transmits, refracts, diffracts, or reflects a light ray of an optical element is known as an optically functional surface. Taking the example of a lens, the aspherical surface of an aspherical lens and the spherical surface of a spherical lens correspond to optically functional surfaces. In precision press molding, the molding surface of the press mold is precisely transferred to the glass to mold an optically functional surface by press molding. That is, there is no need to conduct mechanical processing such as grinding or polishing to finish the optically functional surface.

Accordingly, the method of the present invention is suited to the manufacturing of optical elements such as lenses, lens arrays, diffraction gratings, and prisms, and is optimal for the manufacturing of aspherical lenses with high production efficiency.

The method of manufacturing optical elements of the present invention permits not only the production of optical elements having the above-described optical characteristics, but also the press of preforms at relatively low temperature as a press molding temperature of glass since the glass constituting the preforms has a low glass transition temperature Tg. This reduces the burden on the molding surface of the press mold and extends the service life of the press mold. Since the glass constituting the preforms is highly stable, devitrification of the glass can be effectively prevented during reheating and the pressing step. Still further, a series of steps from melting the glass to manufacturing the final product can be conducted with high productivity.

Press molds in which a mold release film is provided on the molding surface of the mold material such as silicon carbide, an ultrahard material, and stainless steel and other known press molds can be employed in the precision press molding. A carbon-containing film, precious metal alloy film, or the like may be employed as the mold release film. The press mold comprises upper and lower molds and a sleeve mold if necessary. When employing a preform of glass the yield point of which exceeds 500° C., a mold in which a mold release film of a precious metal alloy film is provided on the molding surface of a mold material such as an ultrahard material may be employed. However, the use of a press mold comprised of a material of better heat resistance is desirable and a mold release film provided on the molding surface desirably has better heat resistance as well. From this perspective, when precision press molding the above-described preform, the use of a press mold made of silicon carbide is preferred, and the use of a mold provided with a mold release film in the form of a carbon-containing film on the molding surface of the mold is of even greater preference.

In precision press molding, a non-oxidizing gas atmosphere is desirably employed during molding to keep the molding surface of the press mold in good condition. Nitrogen and mixed gases of nitrogen and hydrogen are desirable as the non-oxidizing gas. In particular, when employing a press mold the molding surface of which is provided with a mold release film in the form of a carbon-containing film, and when employing a press mold made of silicon carbide, precision press molding can be conducted in the above-described non-oxidizing atmosphere.

Precision press molding methods particularly suited to the method of manufacturing optical elements of the present invention will be described below.

(Precision Press Molding Method 1)

In this method (referred to as precision press molding method 1), a preform is introduced into a press mold, the press mold and preform are heated together, and precision press molding is conducted.

In precision press molding method 1, both the press mold and preform are desirably heated to a temperature at which the glass constituting the preform exhibits a viscosity of $10^6$ to $10^{12}$ dPa·s and precision press molding is conducted.

After cooling the glass to a temperature at which it exhibits a viscosity of greater than or equal to $10^{12}$ dPa·s, preferably greater than or equal to $10^{14}$ dPa·s, and more preferably greater than or equal to $10^{16}$ dPa·s, the precision press molded article is desirably removed from the press mold.

Based on the above conditions, it is both possible to more precisely transfer the shape of the molding surface of the press mold to the glass and to remove the precision press molded article without deformation.

(Precision Press Molding Method 2)

In this method (referred to as precision press molding method 2), a preheated preform is introduced into a press mold and precision press molding is conducted. In this method, the press mold and the preform for press molding are desirably separately preheated and the preheated preform is introduced into the press mold and precision press molded.

According to this method, since the preform is preheated before being introduced into the press mold, the cycle time can be shortened and optical elements with good surface precision and no surface defects can be manufactured.

The press mold is desirably preheated to a temperature lower than that to which the preform is preheated. Such preheating makes it possible to keep the preheating temperature of the press mold low, reducing wear and tear on the press mold.

In precision press molding method 2, preheating is preferably conducted to a temperature at which the glass constituting the preform exhibits a viscosity of less than or equal to $10^9$ dPa·s, more preferably $10^9$ dPa·s.

Further, preheating is preferably conducted while floating the above-described preform, it being desirable for preheating to be conducted to a temperature at which the glass constituting the preform exhibits a viscosity of $10^{5.5}$ to $10^9$ dPa·s, more preferably greater than or equal to $10^{5.5}$ and less than $10^9$ dPa·s.

Cooling of the glass is desirably begun either simultaneously with the start of pressing or during pressing.

The temperature of the press mold is adjusted to be lower than the temperature to which the preform is preheated; a temperature at which the glass exhibits a viscosity of $10^9$ to $10^{12}$ dPa·s can be used as a yardstick.

In this method, following press molding, removal from the mold is desirably conducted after cooling to a temperature at which the glass exhibits a viscosity of greater than or equal to $10^{12}$ dPa·s.

The precision press molded optical element is removed from the press mold and gradually cooled as needed. When the molded article is an optical element such as a lens, the surface thereof can be coated with an optical thin film as needed.

EXAMPLES

The present invention is further described below through Examples.

Examples 1 to 20

Table 1 gives the glass composition, refractive index (nd), Abbé number (vd), glass transition temperature (Tg), yield point (Ts), liquid phase temperature (L.T.), specific gravity, and haze value (a weatherability indicator) of each example. All of the glasses employed oxides, hydroxides, carbonates, and nitrates corresponding to the various components as starting materials. The starting materials were weighed out in such a manner as to yield the compositions listed in Table 1 following vitrification, adequately mixed, charged to a platinum crucible, melted in an electric furnace at a temperature range of 1,050 to 1,200° C., homogenized by stirring, clarified, and cast into a mold preheated to a suitable temperature. The cast glass was cooled to the glass transition temperature, immediately transferred to an annealing furnace, and gradually cooled to room temperature to obtain various phosphate optical glasses.

The refractive index (nd), Abbé number (vd), glass transition temperature (Tg), yield point (Ts), liquid phase temperature (L.T.), glass viscosity at the liquid phase temperature (L.T. viscosity), haze value, and specific gravity of the optical glasses obtained were measured in the following manner.

(1) Refractive index (nd) and Abbé number (vd)
Measured for optical glass obtained at a gradual cooling rate of −30° C./hour.

(2) Glass transition temperature (Tg) and yield point (Ts)

Measured for a heating rate of 4° C./minute with a thermomechanical analyzer from Rigaku Denki K.K.

(3) Liquid phase temperature (L.T.)

Approximately 50 g samples of glass were charged to a platinum crucible, melted for about 15 to 60 minutes at about 1,100 to 1,200° C., maintained for two hours at 860° C., 870° C., 880° C., 890° C., 900° C., 910° C., 920° C., 930° C., 940° C., 950° C., and 960° C., respectively, and then cooled. The precipitation of crystals, or lack thereof, was observed by microscope, and the lowest temperature at which no crystals were observed was adopted as the liquid phase temperature (L.T.).

(4) The viscosity at the liquid phase temperature (L.T. viscosity)

The viscosity was measured by the viscosity measurement method using a coaxial double drum-type rotating viscometer according to JIS standard Z8803.

(5) Haze value

The ratio of scattered light intensity to transmitted light intensity (scattered light intensity/transmitted light intensity) when white light was transmitted vertically onto the polished surfaces of glass sheets optically polished on both sides that had been maintained for one week in a clean thermo-hygrostat at a temperature of 65° C. and a humidity of 90 percent is denoted as a percentage.

(6) Specific gravity

Calculated by Archimedes' method.

(7) Surface crystallization and internal crystallization

Molten glass in air was cast into a casting mold and a molded glass article having a flat, free surface on top was produced. This molded glass article was cut into rectangular parallelepiped glass samples measuring 1×1×2 cm$^3$. The molded glass article was cut so that one of the surfaces of the glass samples (1×2 cm$^2$) became a part of the free surface. This glass sample was heated at a rate of 30° C./minute to 610° C., maintained at that temperature for 10 minutes, and then cooled (heat treatment A). Subsequently, the glass was observed under magnification by microscope, and the number of crystal grains greater than or equal to 100 nm in diameter present in the glass was counted. The average density of crystal grains greater than or equal to 0.1 μm in diameter that precipitated on the free surface of the glass following heat treatment A was then calculated based on magnified observation by microscope.

The glasses of Examples 1 to 20 were low dispersion glasses with Abbé numbers (vd) of greater than 59 to less than 70 and exhibited high refractive indexes. These glasses had glass transition temperatures of less than or equal to 530° C., yield points of less than or equal to 570° C., and good low-temperature softening properties. Further, all of these glasses had viscosities at their liquid phase temperatures that were suited to the forming of preforms. Still further, these glasses had low haze values and good weatherability, exhibited no internal crystallization and extremely little surface crystallization, and afforded good devitrification stability. No coloration of these glasses was found by visual inspection.

Example 21

Next, glass melts corresponding to Examples 1 to 20 that had been clarified and homogenized were caused to flow at a prescribed flow rate out of a platinum alloy pipe the temperature of which had been adjusted to within a range permitting stable flow without devitrification of the glass. The outflowing glass melt was dripped down or drop-cut to separate glass melt gobs of the weight of the targeted preforms. The glass melt gobs were received in a receiving mold the bottom of which had gas spray outlets, and the glass melt gobs were formed into preforms for precision press molding while being floated by gas blown out through the gas spray outlets. The separation interval of the glass melt was adjusted to obtain spherical preforms 2 to 30 mm in diameter. The weight of the preforms precisely matched the settings and all surfaces thereof were smooth.

Example 22

The preforms obtained in Example 21 were precision press molded in the apparatus shown in FIG. 1 to obtain aspherical lenses. Specifically, the preform was placed between lower mold 2 and upper mold 1 of a press mold, the interior of quartz tube 11 was backfilled with a nitrogen atmosphere, power was supplied to heater 12, and quartz tube 11 was heated. The temperature on the interior of the press mold was set so that the glass being molded exhibited a viscosity of $10^8$ to $10^{10}$ dPa·s, and while maintaining this temperature, push rod 13 was lowered to push down upper mold 1, pressing the preform that had been set in the press mold. The pressing pressure of 8 MPa was applied for 30 seconds. Following pressing, the pressing pressure was removed and the press molded glass article was gradually cooled while still in contact with lower mold 2 and upper mold 1 to a temperature where the glass exhibited a viscosity of greater than or equal to $10^{12}$ dPa·s. Next, the molded glass article was cooled rapidly to room temperature and removed from the press mold, yielding an aspherical lens. The aspherical lens obtained exhibited extremely high surface precision.

An antireflective film can be provided as needed on aspherical lenses obtained by precision press molding.

Example 23

The preform obtained in Example 22 was preheated to a temperature at which the glass constituting the preform exhibited a viscosity of $10^8$ dPa·s while being floated. A press mold comprising an upper mold, lower mold, and sleeve mold was separately heated to a temperature at which the glass exhibited a viscosity of $10^9$ to $10^{12}$ dPa·s, and the preheated preform was introduced into the cavity of the press mold and precision press molded. A pressing pressure of 10 MPa was employed. Cooling of the glass and press mold was begun at the start of pressing. After cooling to a temperature at which the molded glass exhibited a viscosity of greater than or equal to $10^{12}$ dPa·s, the molded article was separated from the mold, yielding an aspherical lens. The aspherical lens obtained exhibited extremely high surface precision.

An antireflective film can be provided as needed on aspherical lenses obtained by precision press molding.

TABLE 1

Table 1 (composition is denoted as mass %)

| | | Example No. | | | | |
|---|---|---|---|---|---|---|
| | | 1 Mass % | 2 Mass % | 3 Mass % | 4 Mass % | 5 Mass % |
| Composition | $P_2O_5$ | 40.58 | 40.41 | 52.90 | 32.06 | 35.24 |
| | $B_2O_3$ | 4.98 | 4.96 | 11.98 | 4.72 | 5.19 |
| | $Al_2O_3$ | 2.43 | 2.42 | 4.68 | 2.30 | 2.53 |
| | $Li_2O$ | 3.56 | 2.84 | 3.43 | 2.03 | 2.97 |
| | $Na_2O$ | 0.00 | 0.00 | 1.78 | 0.00 | 0.00 |
| | $K_2O$ | 0.00 | 0.00 | 2.70 | 0.00 | 0.00 |
| | MgO | 3.36 | 3.82 | 8.09 | 3.64 | 5.00 |
| | CaO | 4.68 | 5.32 | 7.07 | 5.07 | 6.96 |
| | SrO | 0.00 | 0.00 | 2.97 | 0.00 | 0.00 |
| | BaO | 36.53 | 36.37 | 4.40 | 34.64 | 38.07 |
| | ZnO | 3.88 | 3.86 | 0.00 | 7.35 | 4.04 |
| | $Gd_2O_3$ | 0.00 | 0.00 | 0.00 | 8.19 | 0.00 |
| | Total | 100.00 | 100.00 | 100.00 | 100.00 | 100.00 |
| | $P_2O_5/B_2O_3$ | 8.1 | 8.1 | 4.4 | 6.8 | 6.8 |
| | $BaO/B_2O_3$ | 7.3 | 7.3 | 0.4 | 7.3 | 7.3 |
| | MgO + CaO | 8.0 | 9.1 | 15.2 | 8.7 | 12.0 |
| | SrO + BaO | 36.5 | 36.4 | 7.4 | 34.6 | 38.1 |
| | (MgO + CaO)/(SrO + BaO) | 0.22 | 0.25 | 2.06 | 0.25 | 0.31 |
| | $\Sigma R''O/\Sigma R'O$ | 13.6 | 17.4 | 2.8 | 25.0 | 18.2 |
| Characteristics | $T_g$ [° C.] | 485 | 500 | 485 | 528 | 514 |
| | $T_s$ [° C.] | 528 | 541 | 526 | 574 | 559 |
| | LT [° C.] | 900 | 900 | 950 | 950 | 900 |
| | LT viscosity [dPa·s] | 6 | 9 | 7 | 5 | 8 |
| | Specific gravity [g/cm$^3$] | 3.54 | 3.55 | 2.80 | 3.88 | 3.63 |
| | Nd | 1.6116 | 1.6129 | 1.5638 | 1.6415 | 1.6242 |
| | νd | 64.5 | 64.2 | 68.4 | 60.5 | 62.5 |
| | Surface crystal (pieces/cm$^2$) | <100000 | <100000 | <1000 | <100000 | <100000 |
| | Internal crystals | Not observed | Not observed | Not observed | Not observed | Not observed |
| | HAZE [%] | 0.3 | 0.2 | 1.3 | 0.3 | 0.3 |

| | | Example No. | | | | |
|---|---|---|---|---|---|---|
| | | 6 Mass % | 7 Mass % | 8 Mass % | 9 Mass % | 10 Mass % |
| Composition | $P_2O_5$ | 37.78 | 47.08 | 45.44 | 45.70 | 46.08 |
| | $B_2O_3$ | 4.38 | 16.80 | 11.14 | 20.38 | 21.52 |
| | $Al_2O_3$ | 3.45 | 3.08 | 2.72 | 2.99 | 4.73 |
| | $Li_2O$ | 3.61 | 3.61 | 3.19 | 3.50 | 3.69 |
| | $Na_2O$ | 0.00 | 1.87 | 0.00 | 0.00 | 0.00 |
| | $K_2O$ | 0.00 | 2.84 | 0.00 | 2.76 | 2.91 |
| | MgO | 4.88 | 8.51 | 5.38 | 5.90 | 7.47 |
| | CaO | 6.78 | 8.46 | 7.48 | 8.21 | 10.40 |
| | SrO | 0.00 | 3.13 | 8.29 | 6.07 | 3.20 |
| | BaO | 35.61 | 4.62 | 16.36 | 4.49 | 0.00 |
| | ZnO | 0.00 | 0.00 | 0.00 | 0.00 | 0.00 |
| | $Gd_2O_3$ | 3.51 | 0.00 | 0.00 | 0.00 | 0.00 |
| | Total | 100.00 | 100.00 | 100.00 | 100.00 | 100.00 |
| | $P_2O_5/B_2O_3$ | 8.6 | 2.8 | 4.1 | 2.2 | 2.1 |
| | $BaO/B_2O_3$ | 8.1 | 0.3 | 1.5 | 0.2 | 0.0 |
| | MgO + CaO | 11.7 | 17.0 | 12.9 | 14.1 | 17.9 |
| | SrO + BaO | 35.6 | 7.8 | 24.7 | 10.6 | 3.2 |
| | (MgO + CaO)/(SrO + BaO) | 0.33 | 2.19 | 0.52 | 1.34 | 5.58 |
| | $\Sigma R''O/\Sigma R'O$ | 13.1 | 3.0 | 11.8 | 3.9 | 3.2 |
| Characteristics | $T_g$ [° C.] | 510 | 484 | 519 | 497 | 496 |
| | $T_s$ [° C.] | 558 | 528 | 562 | 540 | 540 |
| | LT [° C.] | 880 | 900 | 950 | 950 | 950 |
| | LT viscosity [dPa·s] | 12 | 9 | 5 | 6 | 5 |
| | Specific gravity [g/cm$^3$] | 3.58 | 2.80 | 3.16 | 2.80 | 2.68 |
| | Nd | 1.6197 | 1.5656 | 1.5923 | 1.5666 | 1.5603 |
| | νd | 64.0 | 67.9 | 67.4 | 68.1 | 67.9 |
| | Surface crystal (pieces/cm$^2$) | <1000 | <100 | <1000 | <10000 | <1000 |
| | Internal crystals | Not observed | Not observed | Not observed | Not observed | Not observed |
| | HAZE [%] | 0.4 | 0.9 | 0.3 | 11 | 0.7 |

TABLE 1-continued

Table 1 (composition is denoted as mass %)

|  |  | Example No. | | | | |
|---|---|---|---|---|---|---|
|  |  | 11 Mass % | 12 Mass % | 13 Mass % | 14 Mass % | 15 Mass % |
| Composition | $P_2O_5$ | 41.20 | 44.96 | 46.40 | 48.03 | 51.96 |
|  | $B_2O_3$ | 4.38 | 4.78 | 9.48 | 17.13 | 11.76 |
|  | $Al_2O_3$ | 3.45 | 3.77 | 2.78 | 3.14 | 2.87 |
|  | $Li_2O$ | 3.61 | 4.10 | 4.07 | 5.52 | 3.37 |
|  | $Na_2O$ | 0.00 | 0.00 | 0.00 | 0.00 | 0.00 |
|  | $K_2O$ | 0.00 | 0.00 | 0.00 | 0.00 | 2.65 |
|  | MgO | 4.09 | 6.17 | 6.15 | 9.92 | 7.94 |
|  | CaO | 5.70 | 8.59 | 7.64 | 5.17 | 7.90 |
|  | SrO | 0.00 | 0.00 | 6.77 | 6.37 | 2.92 |
|  | BaO | 35.60 | 25.91 | 16.71 | 4.72 | 8.63 |
|  | ZnO | 1.97 | 1.72 | 0.00 | 0.00 | 0.00 |
|  | $Gd_2O_3$ | 0.00 | 0.00 | 0.00 | 0.00 | 0.00 |
|  | Total | 100.00 | 100.00 | 100.00 | 100.00 | 100.00 |
|  | $P_2O_5/B_2O_3$ | 9.4 | 9.4 | 4.9 | 2.8 | 4.4 |
|  | $BaO/B_2O_3$ | 8.1 | 5.4 | 1.8 | 0.3 | 0.7 |
|  | MgO + CaO | 9.8 | 14.8 | 13.8 | 15.1 | 15.8 |
|  | SrO + BaO | 35.6 | 25.9 | 23.5 | 11.1 | 11.6 |
|  | (MgO + CaO)/ (SrO + BaO) | 0.28 | 0.57 | 0.59 | 1.36 | 1.37 |
|  | ΣR"O/ΣR'O | 13.1 | 10.3 | 9.2 | 4.7 | 4.5 |
| Characteristics | $T_g$ [° C.] | 495 | 490 | 501 | 495 | 502 |
|  | $T_s$ [° C.] | 535 | 533 | 541 | 538 | 544 |
|  | LT [° C.] | 880 | 870 | 930 | 930 | 930 |
|  | LT viscosity [dPa · s] | 9 | 8 | 6 | 5 | 9 |
|  | Specific gravity [g/cm³] | 3.49 | 3.28 | 3.13 | 2.84 | 2.89 |
|  | Nd | 1.6096 | 1.6018 | 1.5925 | 1.5736 | 1.5699 |
|  | ν4 | 64.9 | 65.8 | 67.4 | 68.0 | 68.3 |
|  | Surface crystal (pieces/cm²) | <100000 | <100 | <1000 | <10000 | <1000 |
|  | Internal crystals | Not observed | Not observed | Not observed | Not observed | Not observed |
|  | HAZE [%] | 0.2 | 0.2 | 0.3 | 14 | 1 |

|  |  | Example No. | | | | |
|---|---|---|---|---|---|---|
|  |  | 16 Mass % | 17 Mass % | 18 Mass % | 19 Mass % | 20 Mass % |
| Composition | $P_2O_5$ | 49.88 | 38.05 | 43.20 | 45.47 | 47.51 |
|  | $B_2O_3$ | 14.27 | 5.09 | 5.30 | 4.83 | 9.71 |
|  | $Al_2O_3$ | 2.99 | 2.48 | 2.59 | 3.81 | 2.84 |
|  | $Li_2O$ | 4.38 | 3.64 | 3.94 | 4.15 | 5.00 |
|  | $Na_2O$ | 0.00 | 0.00 | 0.00 | 0.00 | 0.00 |
|  | $K_2O$ | 0.00 | 0.00 | 0.00 | 0.00 | 0.00 |
|  | MgO | 8.26 | 3.93 | 5.11 | 6.46 | 5.62 |
|  | CaO | 8.21 | 5.47 | 7.11 | 8.98 | 7.82 |
|  | SrO | 3.03 | 0.00 | 0.00 | 0.00 | 8.67 |
|  | BaO | 8.98 | 37.37 | 31.10 | 24.56 | 12.83 |
|  | ZnO | 0.00 | 3.97 | 1.65 | 1.74 | 0.00 |
|  | $Gd_2O_3$ | 0.00 | 0.00 | 0.00 | 0.00 | 0.00 |
|  | Total | 100.00 | 100.00 | 100.00 | 100.00 | 100.00 |
|  | $P_2O_5/B_2O_3$ | 3.5 | 7.5 | 8.2 | 9.4 | 4.9 |
|  | $BaO/B_2O_3$ | 0.6 | 7.3 | 5.9 | 5.1 | 1.3 |
|  | MgO + CaO | 16.5 | 9.4 | 12.2 | 15.4 | 13.4 |
|  | SrO + BaO | 12.0 | 37.4 | 31.1 | 24.6 | 21.5 |
|  | (MgO + CaO)/ (SrO + BaO) | 1.37 | 0.25 | 0.39 | 0.63 | 0.63 |
|  | ΣR"O/ΣR'O | 6.5 | 13.9 | 11.4 | 10.1 | 7.0 |
| Characteristics | $T_g$ [° C.] | 501 | 490 | 488 | 489 | 492 |
|  | $T_s$ [° C.] | 540 | 532 | 531 | 532 | 534 |
|  | LT [° C.] | 910 | 900 | 880 | 870 | 940 |
|  | LT viscosity [dPa · s] | 7 | 6 | 8 | 9 | 5 |
|  | Specific gravity [g/cm³] | 2.90 | 3.58 | 3.38 | 3.26 | 3.09 |
|  | Nd | 1.5781 | 1.6171 | 1.6047 | 1.6005 | 1.5899 |
|  | ν4 | 68.0 | 63.7 | 65.5 | 65.8 | 67.5 |
|  | Surface crystal (pieces/cm²) | <100000 | <10000 | <1000 | <100 | <1000 |

TABLE 1-continued

Table 1 (composition is denoted as mass %)

| Internal crystals | Not observed | Not observed | Not observed | Not observed | Not observed |
|---|---|---|---|---|---|
| HAZE[%] | 1 | 0.2 | 0.3 | 0.3 | 0.4 |

Note 1:
$\Sigma R"O = MgO + CaO + SrO + BaO + ZnO$
Note 2:
$\Sigma R'O = Li_2O + Na_2O + K_2O$ The present invention provides low-dispersion phosphate optical glass suited to precision press molding, especially to hot molding. Preforms for precision press molding can be manufactured with high productivity by hot molding the optical glass of the present invention. Furthermore, the present invention provides an optical element comprised of low-dispersion glass.

What is claimed is:

1. Phosphate optical glass having an Abbé number, vd, of greater than 59 and less than 70, comprising the following components, denoted as mass percentages:
   $P_2O_5$: 18 to 70 percent, where 70 percent is excluded;
   $B_2O_3$: 0 to 34 percent, where 0 percent is excluded;
   $Al_2O_3$: 0 to 8 percent;
   $Li_2O$: 0 to 20 percent, where 0 percent is excluded;
   $Na_2O$: 0 to 18 percent;
   $K_2O$: 0 to 15 percent;
   MgO: 0 to 25 percent, where 0 percent is excluded;
   CaO: 0 to 18 percent, where MgO+CaO>4 percent;
   SrO: 0 to 20 percent;
   BaO: 0 to 40 percent, where SrO+BaO>1 percent and $BaO/B_2O_3$, as a mass percentage ratio, is 0 to 15;
   ZnO: 0 to 14 percent,
   where the ratio of $\Sigma R"O/\Sigma R'O$ as a mass percentage ratio is less than 23, where $\Sigma R"O=MgO+CaO+SrO+BaO+ZnO$ and $\Sigma R'O=Li_2O+Na_2O+K_2O$;
   $Gd_2O_3$: 0 to 18 percent;
   $Sb_2O_3$: 0 to 1 percent;
   wherein any other component besides those listed above has a content lower than the content of $B_2O_3$ as well as lower than the content of $Li_2$.

2. Phosphate optical glass having an Abbé number, vd, of greater than 59 and less than 70, comprising the following components, denoted as mass percentages:
   $P_2O_5$: 18 to 70 percent, where 70 percent is excluded;
   $B_2O_3$: 0.6 to 34 percent, where $P_2O_5/B_2O_3$, as a mass percentage ratio, is 2.04 to 30;
   $Al_2O_3$: 0 to 8 percent;
   $Li_2O$: 0 to 20 percent, where 0 percent is excluded;
   $Na_2O$: 0 to 18 percent;
   $K_2O$: 0 to 15 percent;
   MgO: 0 to 25 percent;
   CaO: 0 to 18 percent, where MgO+CaO>4 percent;
   SrO: 0 to 20 percent;
   BaO: 0 to 40 percent, where SrO+BaO>1 percent and $BaO/B_2O_3$, as a mass percentage ratio, is 0 to 15;
   ZnO: 0 to 14 percent,
   where the ratio of $\Sigma R"O/\Sigma R'O$ as a mass percentage ratio is less than 23, where $\Sigma R"O=MgO+CaO+SrO+BaO+ZnO$ and $\Sigma R'O=Li_2O+Na_2O+K_2O$;
   $Gd_2O_3$: 0 to 18 percent;
   $Sb_2O_3$: 0 to 1 percent;
   wherein any other component besides those listed above has a content lower than the content of $B_2O_3$ as well as lower than the content of $Li_2O$.

3. The phosphate optical glass according to claim 1 or 2, comprising the following components, denoted as mass percentages:
   $P_2O_5$: 20 to 60 percent;
   $B_2O_3$: 0.6 to 28 percent, where $P_2O_5/B_2O_3$, as a mass percentage ratio, is 2.1 to 30;
   $Al_2O_3$: 0 to 8 percent;
   $Li_2O$: 1 to 20 percent, where 1 percent is excluded;
   $Na_2O$: 0 to 18 percent;
   $K_2O$: 0 to 15 percent:
   MgO: 0 to 25 percent, where 0 percent is excluded;
   CaO: 0 to 18 percent, where MgO+CaO>4 percent;
   SrO: 0 to 20 percent;
   BaO: 0 to 39 percent, where SrO+BaO>1 percent and $BaO/B_2O_3$, as a mass percentage ratio, is 0 to 15;
   ZnO: 0 to 14 percent,
   where the ratio of $\Sigma R"O/\Sigma R'O$ as a mass percentage ratio is less than 23, where $\Sigma R"O=MgO+CaO+SrO+BaO+ZnO$ and $\Sigma R'O=Li_2O+Na_2O+K_2O$,
   $Gd_2O_3$: 0 to 18 percent;
   $Sb_2O_3$: 0 to 1 percent.

4. The phosphate optical glass according to claim 1 or 2, which has a refractive index, nd, ranging from 1.54 to 1.66.

5. The phosphate optical glass according to claim 1 or 2, which has a yield point, Ts, of greater than 500° C. and equal to or less than 600° C.

6. A preform for precision press molding being comprised of the phosphate optical glass according to claim 1 or 2.

7. A preform for precision press molding being comprised of the phosphate optical glass having an Abbé number, vd, of greater than 59,
   wherein said glass comprises essential components in the form of $P_2O_5$, $B_2O_3$, $Li_2O$, MgO, CaO, and BaO as well as exhibits a yield point, Ts, of greater than 500° C. and equal to or less than 600° C.

8. The preform for precision press molding according to claim 7, wherein said glass comprises the following components, denoted as mass percentages:
   $P_2O_5$: 18 to 70 percent, where 70 percent is excluded;
   $B_2O_3$: 0 to 34 percent, where 0 percent is excluded;
   $Li_2O$: 0 to 20 percent, where 0 percent is excluded;
   MgO: 0 to 25 percent, where 0 percent is excluded;
   CaO: 0 to 18 percent, where 0 percent is excluded;
   SrO: 0 to 20 percent;
   BaO: 0 to 40 percent, where 0 percent is excluded;
   $Al_2O_3$: 0 to 8 percent;
   $Na_2O$: 0 to 18 percent;
   $K_2O$: 0 to 15 percent;
   ZnO: 0 to 14 percent;
   $Gd_2O_3$: 0 to 18 percent;
   $Sb_2O_3$: 0 to 1 percent.

9. The preform for precision press molding according to claim 6, which is precision press molded with a press mold made of silicon carbide.

10. The preform for precision press molding according to claim 7, which is precision press molded with a press mold made of silicon carbide.

11. A method of manufacturing a preform for precision press molding, wherein glass melt of a prescribed weight is separated from glass melt flow exiting from a outflow pipe to form a preform for precision press molding comprised of the optical glass according to claim 1 or 2.

12. A method of manufacturing a preform for precision press molding, wherein glass melt of a prescribed weight is separated from glass melt flow flowing out from a outflow pipe to form the preform for precision press molding according to claim 6.

13. A method of manufacturing a preform for precision press molding, wherein glass melt of a prescribed weight is separated from glass melt flow flowing out from a outflow pipe to form the preform for precision press molding according to claim 7.

14. An optical element comprised of the phosphate optical glass according to claim 1 or 2.

15. A method of manufacturing an optical element by heating a glass preform to precision press mold with a press mold, wherein
said preform is the preform according to claim 6.

16. A method of manufacturing an optical element by heating a glass preform to precision press mold with a press mold, wherein
said preform is the preform according to claim 7.

17. A method of manufacturing an optical element by heating a glass preform to precision press mold with a press mold, wherein
said preform is a preform manufactured by the method according to claim 11.

18. A method of manufacturing an optical element by heating a glass preform to precision press mold with a press mold, wherein
said preform is a preform manufactured by the method according to claim 12.

19. A method of manufacturing an optical element by heating a glass preform to precision press mold with a press mold, wherein
said preform is a preform manufactured by the method according to claim 13.

20. The method of manufacturing an optical element according to claim 16, wherein
said preform is introduced into the press mold and said mold and said preform are heated together to conduct the precision press molding.

21. The method of manufacturing an optical element according to claim 17, wherein
said preform is introduced into the press mold and said mold and said preform are heated together to conduct the precision press molding.

22. The method of manufacturing an optical element according to claim 18, wherein
said preform is introduced into the press mold and said mold and said preform are heated together to conduct the precision press molding.

23. The method of manufacturing an optical element according to claim 19, wherein
said preform is introduced into the press mold and said mold and said preform are heated together to conduct the precision press molding.

24. The method of manufacturing an optical element according to claim 16, wherein
the preheated preform is introduced into the press mold to conduct the precision press molding.

25. The method of manufacturing an optical element according to claim 17, wherein
the preheated preform is introduced into the press mold to conduct the precision press molding.

26. The method of manufacturing an optical element according to claim 18, wherein
the preheated preform is introduced into the press mold to conduct the precision press molding.

27. The method of manufacturing an optical element according to claim 19, wherein
the preheated preform is introduced into the press mold to conduct the precision press molding.

* * * * *